United States Patent [19]

McCord

[11] Patent Number: 4,778,535

[45] Date of Patent: Oct. 18, 1988

[54] VAPOR GENERATING AND RECOVERY APPARATUS AND PROCESS

[76] Inventor: James W. McCord, 9101 Nottingham Pkwy., Louisville, Ky. 40222

[21] Appl. No.: 425,166

[22] Filed: Sep. 28, 1982

[51] Int. Cl.$^4$ .......................... B08B 3/10; B01D 1/12
[52] U.S. Cl. .................................. 134/35; 134/12; 134/106; 159/901; 202/170; 202/175; 202/176; 202/235; 202/236; 203/98; 203/DIG. 4
[58] Field of Search ............... 202/170, 175, 176, 235, 202/236, 182, 265; 196/123–126; 159/28 R, 28 C, 1 C, 26 R, 27 R; 134/12, 35, 106; 203/100, 98, 39, 99, 90, DIG. 4, DIG. 22; 126/436, 437, 427

[56] References Cited

U.S. PATENT DOCUMENTS

| | | | |
|---|---|---|---|
| 117,290 | 7/1871 | Howarth | 159/1 C |
| 2,678,039 | 5/1954 | Keating | 159/1 C |
| 2,910,119 | 10/1959 | Wennerberg | 159/1 C |
| 3,181,593 | 5/1965 | Lindley | 159/1 C |
| 3,925,148 | 12/1975 | Erwin | 159/1 C |
| 4,302,273 | 11/1981 | Howard | 134/35 |

*Primary Examiner*—Wilbur Bascomb
*Attorney, Agent, or Firm*—Charles G. Lamb

[57] ABSTRACT

An apparatus for vaporizing and recovering, by condensation, a composite mixture of at least two components, at least one of which is a liquid. The apparatus includes at least one chamber in which the mixture is brought to boiling and includes means to condense the vaporized portion of the mixtures. A liquid of the mixture in the vaporizing chamber is vaporized by heating coils and subjected to circulation to uniformly disperse the mixture. The apparatus may further include a system for continuously filtering the mixture in the vaporizing chamber to remove undesirable particulates, a mixture spray device for spraying the mixture into the vaporizing chamber, and an ultrasonic vibrating means.

14 Claims, 2 Drawing Sheets

VAPOR GENERATING AND RECOVERY APPARATUS AND PROCESS

BACKGROUND OF THE INVENTION

1. FIELD OF THE INVENTION

This invention relates to a vapor generating and recovering apparatus for the recovery of vaporized fluids. More particularly, this invention relates to a vapor generating and recovery apparatus for vaporizing at least one liquid component of a composite mixture in a first chamber and condensing the vaporized component. Even more particularly, this invention relates to a circulating means in a vapor generating and recovering apparatus.

2. DESCRIPTION OF THE PRIOR ART

In the cleaning of items, boiling cleaning solutions have been used to remove undesirable material therefrom. The cleaning of these items, such as tools, manufactured parts, and the like, is accomplished by immersing the soiled items into the hot, boiling cleaning solution. In many apparatuses, at least two chambers are provided for carrying out the operation, one being for vaporizing at least one component of the cleaning solution and the other being for condensing and recovering the vaporized components of the cleaning solution, then returning the components to the vaporizing chamber.

SUMMARY OF THE INVENTION

It is an object of the invention to provide a vaporizing generating and recovery apparatus for vaporizing a mixture of components, at least one of the components being a liquid, condensing the vaporized liquid, and returning the condensate to the vaporizing section of the apparatus.

It is another object of the invention to keep the components of the liquid mixture uniformly disposed in the vaporizing section of the apparatus.

It is still another object of the invention to provide continuous cleaning of the liquid mixture in the vaporizing section of the apparatus.

It is a further object of the present invention to provide a spraying means in the vaporizing section of the apparatus.

More particularly, the present invention provides, in a vapor generating and recovery apparatus of the type comprising a housing defining at least one chamber for containing a liquid, heat emitting means for vaporizing the liquid, and heat absorbing means for condensing the vapor, the improvement wherein said heat emitting means comprises means for creating counter-current circulation within the liquid contained in said at least one chamber.

These and other objectives and features of the present invention will become even more clear upon reference to the following description in conjunction with the accompanying drawing.

It is to be understood that the description of the examples of the present invention given hereinafter is not by way of limitation and various modifications within the scope of the present invention will occur to those skilled in the art upon reading the disclosure set forth hereinafter.

BRIEF DESCRIPTION OF THE DRAWING

Referring to the drawings.

DETAILED DESCRIPTION

The figures show a vapor generating and recovery apparatus for vaporizing and condensing a composite mixture A of two or more components B and C. It is realized that even though the systems described hereinafter include a two component mixture, a substantially pure liquid may be used. The apparatus can be used, for example, for cleaning items of oil, grease or particulate matter, or for coating an item with a protective or decorative material. These examples, however, are given only by way of illustrating some end uses of the apparatus and are not to be considered in any way as limitations of the present invention. For the reason that the apparatus 10 has virtually unlimited end use applications, the composition of the composite mixture will, of course, depend upon a particular end use.

Figure 1:
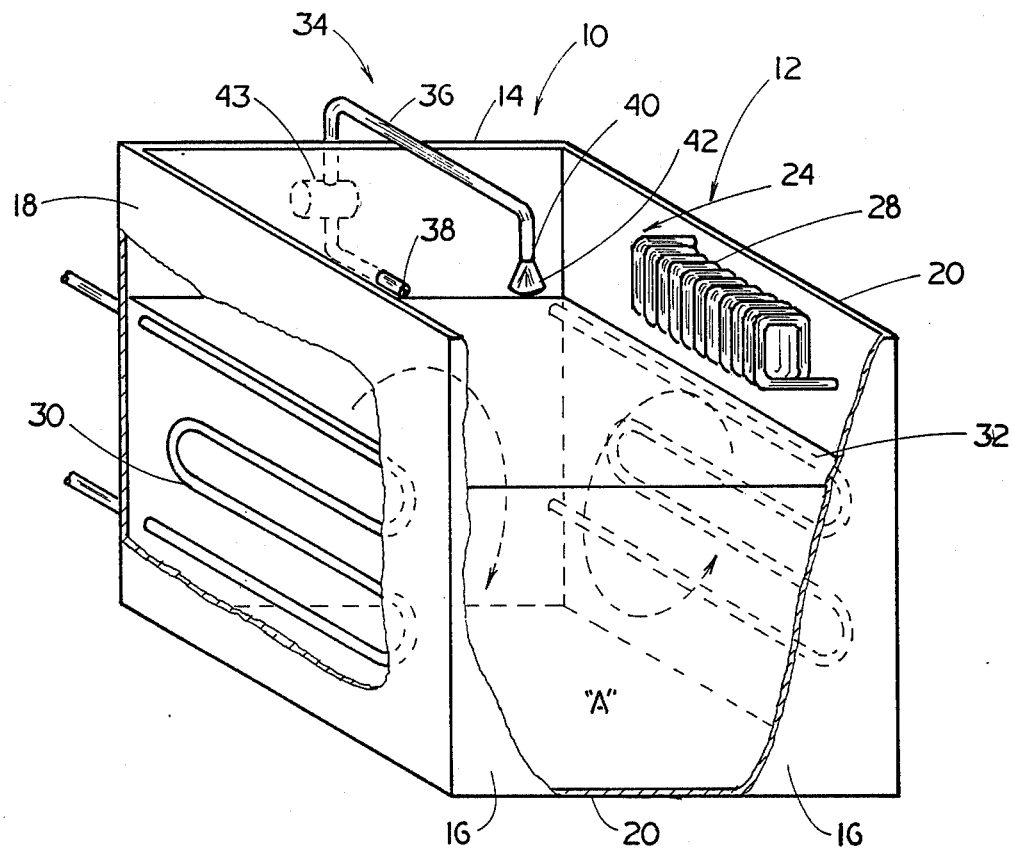
FIG. 1 is a schematic diagram, partially broken away of a preferred vapor generating and recovery apparatus of the present invention.

FIG. 1 shows a vapor generating and recovery apparatus, generally denoted as the number 10, including a housing 12 comprising spaced apart side walls 14 and 16, spaced apart end walls 18 and 20, and a floor 22 defining a single chamber 24 in which the composite liquid mixture A is both vaporized and the vapor condensed.

In order to condense a vaporized composite liquid mixture, a condensing coil 28 is disposed in the chamber 24 above the normal operating level of the condensed liquid mixture A therein. As shown, the condensing coil 28 maintains a preselected temperature in the chamber 24 above the normal operating level of the condensed liquid at a temperature below the vaporizing temperature of the liquid mixture, thereby, condensing the vaporized portion of the mixture back into the chamber 24 and preventing their escape from the housing 12.

The condensed composite liquid mixture A in the chamber 24 is vaporized in the chamber 24 by means of a pair of heating coils 30 and 32 disposed within the chamber 24. As shown, the heating coils 30 and 32 are located at opposite ends of the chamber 24 from each other. As shown, the heating coil 30 is located at the housing end wall 18 below the normal operating level of the liquid mixture, and the other heating coil 32 is located at the opposite housing end wall 20, generally beneath the condensing coil 28, and also below the normal operating level of the composite liquid mixture. Preferably, each of the heating coils 30 and 32 are heated to provide sufficient heat to vaporize at least one component of the liquid mixture, and also create a counter-current, rolling circulation within the liquid mixture (as depicted by the broken arrows in the Figure) to keep the components of the liquid mixture uniformly dispersed.

The means for adding heat to the heating coils 30 and 32, and removing heat from the condensing coil 28 can be accomplished by virtually any known or otherwise convenient means. One preferred means is a refrigerant system, such as described in U.S. Pat. No. 4,003,798 wherein the heating coils 30 and 32 are refrigerant condensing coils of the system and the condensing coils 28 is a refrigerant evaporator coil of the system.

The vapor generating and recovery apparatus 10 is shown as also comprising super-heated spray means, generally denoted as the number 34. The super-heated spray means 34 functions to provide a spray of super-heated vapor for decreasing the drying time of the items being treated in the apparatus. The spray means 34 is shown as comprising a conduit 36 having an inlet end 38 in flow communication with the vaporized liquid mixture in the area between the normal operating level of the liquid mixture and the condensing coil 28, and an outlet end 40 spaced a distance above the normal operating level of the liquid mixture. A spray head 42 is attached at the outlet end 40 of the conduit 36 to direct the spray of vapor generally downwardly toward the surface of the condensing liquid mixture in the chamber 24. A fan or blower 43 is provided in the conduit 36 to move the vapor through the conduit 36.

Items to be treated, such as coated, are immersed in the liquid mixture in the chamber 24 which for this end use may contain, for example, a liquid cleaning solvent B and a silicon treating component C. The treating is accomplished primarily by the non-volatile component C of the mixture attaching to and coating the object to be treated. The rolling counter-current circulation of the liquid mixture A caused by the opposite heating coils 30 and 32 contributes to the treating process due to the uniformity of the mixing action. Either before and/or after the items being treated are immersed in the liquid mixture A, they may be passed under the spray coming from the spray head 42 for a pre-rinse and/or post rinse thereof.

Figure 2:
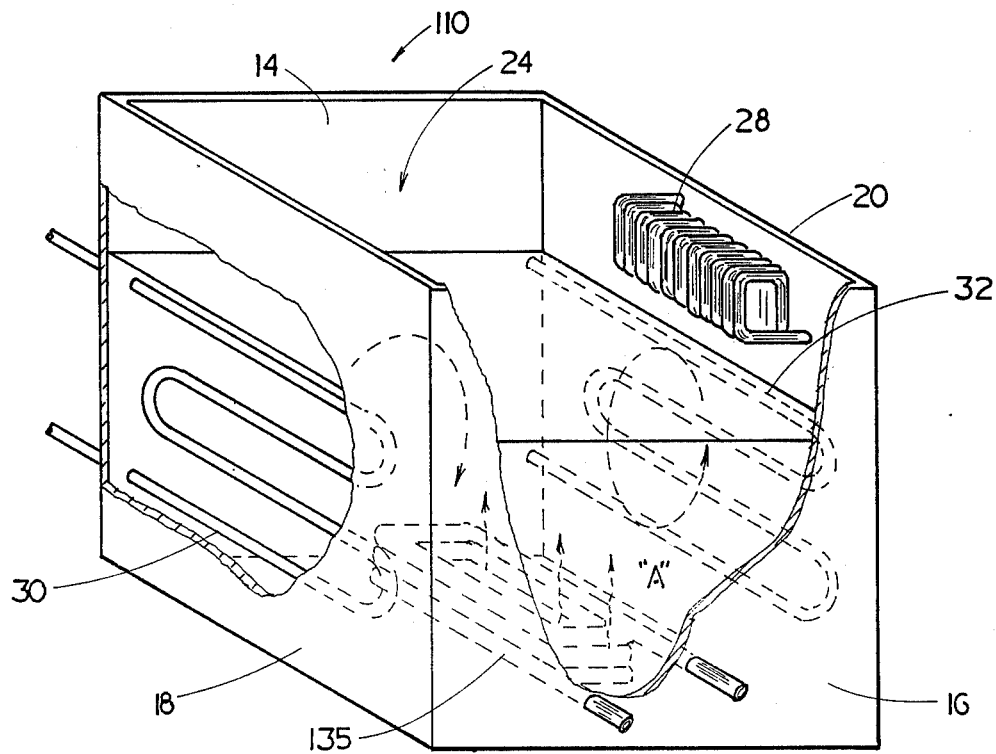
FIG. 2 is a schematic diagram, partially broken away of another preferred vapor generating and recovery apparatus of the present invention.

FIG. 2 illustrates a vapor generating and recovery apparatus 110 which, in many respects, is virtually identical to the vapor generating and recovery apparatus 10 of FIG. 1. Therefore, in FIG. 2, the numbers identifying the components common to both the apparatus 110 and the apparatus 10 are the same as those used in FIG. 1, and the above-description of the structure and function of the apparatus 10 equally applies to the apparatus 110 and will therefore, not be repeated. The only difference between the apparatus 110 and the apparatus 10 is that the vapor generating and recovery apparatus 110 includes another heating coil 135 disposed at the floor of the chamber 24. The heating coil 135 also provides heat to the liquid mixtures sufficient to vaporize the components thereof, and due to its location at the bottom of the chamber 24, creates currents of rising vapor within the liquid mixture. The generally upwardly moving currents generated by the rising vapors created by the heating coil 135, as well as the counter-currents created by the heating coils 30 and 32, provide a scrubbing action to the liquid mixture and also keep the components B and C of the liquid mixture substantially evenly dispersed. The heating coil 135 is preferably a refrigerant condensing coil of the refrigerant system.

Figure 3:
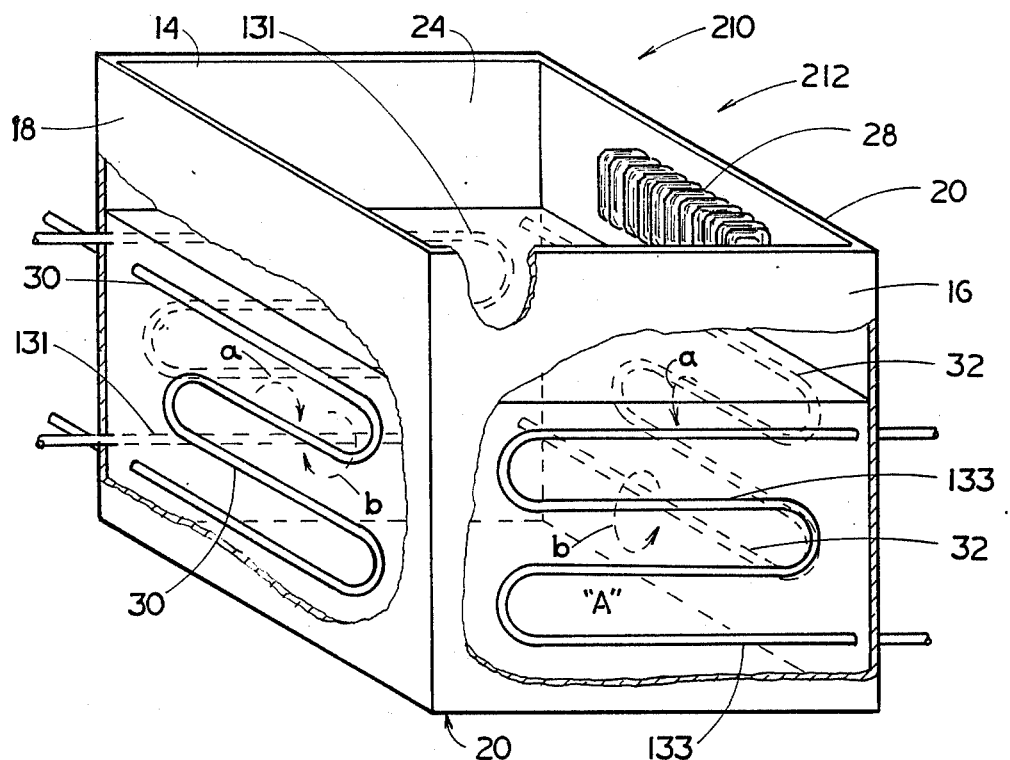
FIG. 3 is a schematic diagram, partially broken away, of yet another prferred vapor generating and recovery apparatus of the present invention; and, FIG. 4 is a schematic diagram, partially broken away, of still another preferred vapor generating and recovery apparatus of the present invention.

FIG. 3 shows a vapor generating and recovery apparatus 210 which has many components in common with the apparatus 10 of FIG. 1. For this reason, the components of the apparatus 210 in FIG. 3 which correspond to various components of the apparatus 10 in FIG. 1 are identified by the same numbers, and the above-description of the apparatus 10, which applies equally as well to the apparatus 210, will not be repeated. The apparatus 210 shown in FIG. 3 differs from the apparatus 10 to the extent that a second pair of heating coils 131 and 133 are disposed in the chamber 24 in addition to the heating coils 30 and 32. As shown, the heating coils 131 and 133 are located at opposite sides of the chamber 24 from each other. For example, the heating coil 131 is located at the housing side wall 14 below the normal operating level of the liquid mixture, and the other heating coil 133, is located at the opposite housing side wall 16 below the normal operating level of the liquid mixture. As with the heating coils 30 and 32, the heating coils 131 and 133 each, preferably, extend from the surface of the liquid mixture down into the liquid mixture substantially the entire depth of the liquid mixture. Thus, the chamber 24 is surrounded by liquid mixture heating coils. The heating coils 131 and 133, as well as the heating coils 30 and 32, are heated to provide sufficient heat to vaporize the components of the liquid mixture. The heating coils 30 and 32 create a counter-current, rolling circulation within the liquid mixture (as depicted by the broken arrows "b") which is generally normally to the counter-current circulation "a". The countercurrent circulations "a" and "b" cooperate to keep the components of the liquid mixture uniformly dispersed.

Figure 4:
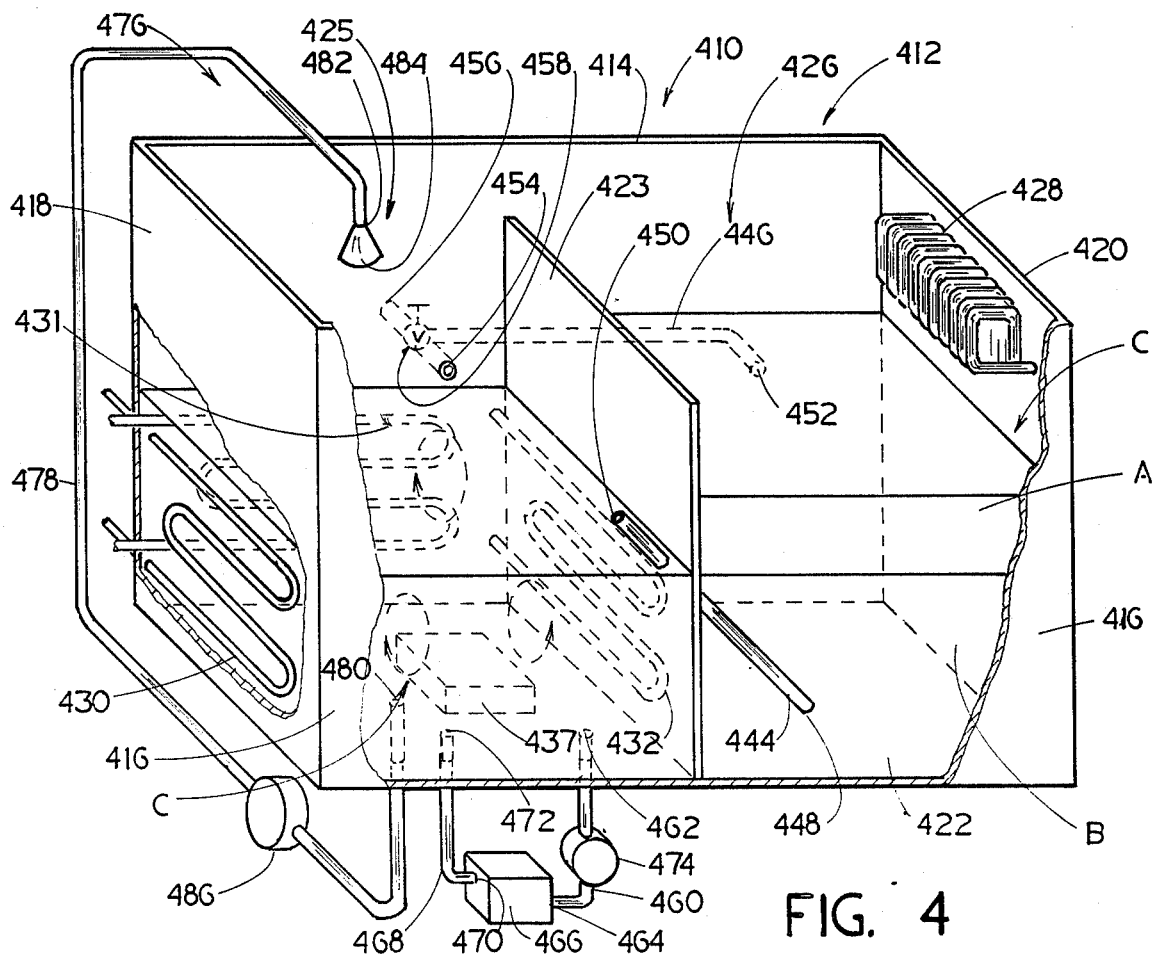

A vapor generating and recovery apparatus 410 is shown in FIG. 4 as including a housing 412 comprising spaced apart side walls 414 and 416, spaced apart end walls 418 and 420, and a floor 422. A weir 423 is disposed in the interior of the housing spanning the distance between the side walls 414 and 416, thus dividing the housing interior into a vaporizing chamber 425 and a condensing chamber 426.

In order to condense vaporized composite mixture A in the condensing chamber 426, a condensing coil 428 is disposed in the condensing chamber 426. As shown, the condensing coil 428 is located at the housing end wall 420 across the condensing chamber from the weir 423 and is positioned so that at least a portion of the condensing coil 428 is below the upper extremity of the weir 423 and above the normal operating level of the liquid mixture A in the condensing chamber 426. The condensing coil 428 maintains a pre-selected temperature in the condensing chamber 426 below the vaporizing temperature of the liquid components B and C, thereby condensing at least component B into the condensing chamber 426, and preventing the vaporized component B from escaping the housing 412.

At least one of the components of the composite mixture A is vaporized in the vaporizing chamber 425 by means of three heated cells 430, 431 and 432 disposed in the vaporizing chamber. As shown, the heated coils 430 and 432 are located at opposite ends of the vaporizing chamber 425 from each other, and heating coil 431 is between the two heating coils 430 and 432 to one side of the vaporizing chamber 425. In FIG. 4 heating coil 430 is located at the housing end wall 418 across the vaporizing chamber 425 from the weir 423 and below the operating level of the composite liquid of the composite liquid mixture A, and heating coil 431 is located at the housing side wall 414 below the operating level of the composite liquid mixture A. However, it is also contemplated that in some cases the heating coil arrangements illustrated in FIGS. 1, 2 and 3 can be substituted for the three heating coil arrangement shown in FIG. 4. The heating coils serve a dual function in the vaporizing chamber. First, the coils 430, 431 and 432 are heated to provide sufficient heat to vaporize components B. Second, the pair of oppositely disposed coils 430 and 431 create a counter-current, rolling circulation within the composite liquid mixture A (as depicted by the two broken arrows "b") generally normal to the currents "a" to keep the components B and C uniformly dispersed and to produce a scrubbing action to the liquid for hard to remove material.

The means for adding heat to the heating coils 430, 431 and 432, and removing heat from the condensing coil 428 can be accomplished by virtually any known or otherwise convenient means. One preferred means is a refrigerant system, such as described in U.S. Pat. No. 4,003,798, wherein the heating coils 430, 431 and 432 are refrigerant condensing of the system and the condensing coil 428 is a refrigerant evaporator coil of the system.

Two separate paths of liquid communication are established from the condensing chamber 426 to the vaporizing chamber 425 by means of conduits 444 and 446. Conduit 444 is shown as being angularly oriented to the vertical with its lower inlet end 448 near the bottom region of the condensing chamber 426, and its upper outlet end 450 in the vaporizing chamber 425 at a preselected position below the upper extremity of the weir 423 and above the desired operating level of the composite liquid mixture therein. As depicted, the conduit 444 extends through the weir 423, but it should be realized that the conduit 444 can extend around the outside of the housing 412 without departing from the scope of the present invention. The conduit 446 is shown as being generally horizontally disposed with its open inlet end 452 at a preselected location below the upper extremity of the weir 423 in the condensing chamber 426. The outlet end of the conduit 446 has two branches 454 and 456. The branch 454 is open to the vaporizing chamber 425 below the upper extremity of the weir 423 above the desired operating level of the liquid therein, and the branch 456 leads to a location outside of the housing 412. A valve 458 is located between the branches 454 and 456 so that the flow of liquid through either branch 454 or 456 can be selectively controlled.

In operation of apparatus 410, when the level of the heavier component B of the liquid composite mixture A in the condensing chamber 426 reaches a level equal to the outlet end 450 of the conduit 444, the heavier components B will flow through the conduit 444 from the condensing chamber 426 and discharge into the vaporizing chamber 425 through the outlet end 450 of the conduits 444.

With continued reference to FIG. 4 the apparatus 410 also includes means for continuously removing liquid composite mixture A from the vaporizing chamber 425, separating contaminants from the mixture, and returning the clean mixture back into the vaporizing chamber. This means comprises a conduit 460 having an inlet end 462 open to the vaporizing chamber 423 and an outlet end 464 in liquid flow communication with the upstream side of a separator device 466, and another conduit 468 having an inlet end 470 in liquid flow communication with the downstream side of the separator device 466 and an outlet end 472 open to the vaporizing chamber 423. A pump 474 is located in the conduit 460 between the inlet end 462 and separator device 466. Liquid mixture A is pumped out of the vaporizing chamber 423 by the pump 474 and is conveyed by the conduit 460 to the separator device 466. As the liquid mixture A passes through the separator device contaminants are removed, and the clean mixture is returned to the vaporizing chamber 423 through the conduit 468.

The apparatus 410 further includes a liquid mixture spray apparatus, generally denoted by the number 476. The spray apparatus 476 functions to rinse contaminants from the items being treated in the vaporizing chamber 423 and to promote the uniform distribution of components B and C in the mixture A by splashing into the mixture in the vaporizing chamber 423. The spray apparatus 476 is illustrated as comprising liquid mixture conduit 478 having an inlet end 480 in liquid flow communication with the liquid mixture A in the vaporizing chamber 423, and an outlet end 482 located above the operating level of the mixture A in the vaporizing chamber. A spray head 484 is attached at the outer end 482 of the conduit 478 to break up the liquid exiting the conduit and to direct the liquid spray generally downward toward the surface of the mixture A. A pump 486 is located in the conduit 478 for pumping the liquid mixture from the vaporizing chamber through the conduit and out of the spray head 484.

Items to be treated are immersed in the liquid mixture A in the vaporizing chamber 425, which for this end use may contain for example, a liquid cleaning solvent B and a coating component C. The treating is accomplished by the rolling counter-current circulation of the mixture A caused by the heating coils 430, 431 and 432. The cavitation generated by the sonic vibrating device 437 contributes to further the uniform mixing of the components in the treating process. Either before and/or after the items being treated are immersed in the liquid mixture A, they may be passed under the spray of mixture coming from the spray head 484 for a pre-rinse and/or post rinse thereof.

It will be realized that various changes may be made to the specific embodiments shown and described without departing from the principals and spirit of the present invention.

What is claimed:

1. In a vapor generating and recovery apparatus comprising a housing defining at least one chamber for containing a liquid, heat emitting means for vaporizing the liquid and heat absorbing means for condensing the vapor, the improvement wherein said heat emitting means comprises at least one pair of heat emitting devices located within said at least one chamber, the heat emitting devices of said at least one pair being disposed generally opposite each other across said at least one chamber, each heat emitting device creating a circulation of liquid in proximity to each of said heat emitting devices for creating a counter-current circulation of the liquid within said at least one chamber alone and without the use of any physical structure within the at least one chamber, said counter-current circulation defining a rolling action of liquid from each heat emitting device on the liquid surface toward the center of the chamber.

2. The vapor generating and recovery apparatus of claim 1, further comprising heat emitting means located at the bottom of said at least one chamber and between said heat emitting devices of said at least one pair of counter-current creating heat emitting devices.

3. The vapor generating and recovery apparatus of claim 1, wherein each counter-current creating heat emitting device of said at least one pair extends from generally the surface of the liquid contained in said at least one chamber downwardly substantially the entire depth of the liquid.

4. The vapor generating and recovery apparatus of claim 1, wherein said countercurrent circulating creating means comprises at least one pair of heat emitting devices disposed within said at least one chamber, the heat emitting devices of said at least one pair being disposed at opposite sides of said at least one chamber, and another heat emitting device disposed within said at least one chamber at one of the other sides of said at least one chamber.

5. The vapor generating and recovery apparatus of claim 1, wherein said counter current circulation creating means comprises at least one pair of refrigerant condensing coils of a refrigerant system.

6. The vapor generating and recovery apparatus of claim 1, further comprising means for creating cavitation within the liquid being vaporized contained in said at least one chamber.

7. The vapor generating and recovery apparatus of claim 1, further comprising means for removing liquid from the said at least one chamber and spraying the removed liquid mixture generally downwardly back into said at least one chamber so that the spray will splash into the surface of the liquid in said at least one chamber.

8. The vapor generating and recovery apparatus of claim 6, further comprising means for removing vapor from said at least one chamber and spraying the removed vapor generally downwardly into said at least one chamber so that the spray will splash into the surface of the liquid in said at least one chamber.

9. A vapor generating and recovery apparatus comprising:
   a housing;
   at least one weir disposed within said housing dividing the interior of said housing into at least one condensing chamber for containing a liquid and at least one vaporizing chamber for containing a liquid;
   heat absorbing means located in said at least one condensing chamber for condensing vapor therein;
   heat emitting means comprising at least one pair of heat emitting devices located in said at least one vaporizing chamber, the heat emitting devices of said at least one pair being disposed generally opposite each other across said at least one chamber, for vaporizing the liquid therein and for, alone and without the use of any physical structure within the at least one vaporizing chamber, creating counter-current circulation in the liquid in said at least one vaporizing chamber, said counter-current circulation defining a rolling action of liquid from each heat emitting device on the liquid surface toward the center of the chamber;
   conduit means defining two separate flow paths for transferring liquid from said at least one condensing chamber to said at least one vaporizing chamber when the liquid in said at least one condensing chamber reaches a predetermined level in said at least one condensing chamber;
   recirculation means for removing liquid from said at least one vaporizing chamber and returning the removed liquid back to said at least one vaporizing chamber; and
   separator means for separating contaminants from the liquid removed from said at least one vaporizing chamber as the liquid is being recirculated back to said at least one vaporizing chamber.

10. The vapor generating and recovery apparatus of claim 9, further comprising means for creating cavitation within the liquid contained in said at least one vaporizing chamber.

11. The vapor generating and recovery apparatus of claim 9, further comprising means for removing liquid from the said at least one vaporizing chamber and spraying the removed liquid mixture generally downwardly into said at least one vaporizing chamber so that the spray will splash into the surface of the liquid in said at least one vaporizing chamber.

12. The vapor generating and recovery apparatus of claim 9, further comprising means for removing vapor from the said at least one chamber and spraying the removed vapor generally downwardly into said at least one chamber so that the spray will splash into the surface of the liquid in said at least one chamber.

13. The vapor generating and recovery apparatus of claim 9 wherein said heat emitting means substatially surround the periphery of said at least one vaporizing chamber.

14. A method for surface treating items comprising the steps of:
   heating a treating liquid mixture in a chamber at locations proximate opposite sides of the chamber to a temperature sufficiently high to vaporize the liquid, and also to create rolling currents of the liquid within the liquid mixture flowing in opposite directions to each other from the locations at which the liquid mixture is heated, said rolling currents being along the surface of said liquid toward the center of said chamber;
   immersing the items to be treated into the heated liquid mixture subjecting the items to the action of the rolling currents of liquid flowing in opposite directions; and
   removing the treated items from the heated liquid mixture.

* * * * *